US010101012B2

(12) United States Patent
Zimmerman

(10) Patent No.: US 10,101,012 B2
(45) Date of Patent: Oct. 16, 2018

(54) INTERACTIVE ELASTIC LIGHTING FIXTURE

(71) Applicant: Jasmine Zimmerman, Seattle, WA (US)

(72) Inventor: Jasmine Zimmerman, Seattle, WA (US)

( * ) Notice: Subject to any disclaimer, the term of this patent is extended or adjusted under 35 U.S.C. 154(b) by 0 days.

(21) Appl. No.: 15/617,245

(22) Filed: Jun. 8, 2017

(65) Prior Publication Data

US 2017/0356627 A1 Dec. 14, 2017

Related U.S. Application Data

(60) Provisional application No. 62/348,848, filed on Jun. 10, 2016.

(51) Int. Cl.

| | |
|---|---|
| ***F21S 4/00*** | (2016.01) |
| ***F21V 15/01*** | (2006.01) |
| ***F21V 33/00*** | (2006.01) |
| ***F21V 23/00*** | (2015.01) |
| ***F21V 5/04*** | (2006.01) |
| *F21Y 115/10* | (2016.01) |

(52) U.S. Cl.
CPC .............. *F21V 15/012* (2013.01); *F21V 5/04* (2013.01); *F21V 23/001* (2013.01); *F21V 33/0056* (2013.01); *F21Y 2115/10* (2016.08)

(58) Field of Classification Search
USPC ............... 362/223, 224, 221, 217.01, 249.02
See application file for complete search history.

(56) References Cited

U.S. PATENT DOCUMENTS

2018/0031187 A1* 2/2018 Hayashi .................... F21K 9/61

* cited by examiner

*Primary Examiner* — Vip Patel

(57) ABSTRACT

Interactive artificial lighting devices and systems and related methods of assembly and use are provided herein. The lighting devices and systems of various embodiments are shape-changing, responsive to touch, and configured to provide substantial illumination. The lighting devices and systems include: a elongate body firmed of a flexible, elastic, and translucent material; and a light source positioned at a proximal end of a channel extending through the elongate body. The light source may be configured to emit light circumferentially outward from the elongate body along the length of the elongate body.

20 Claims, 10 Drawing Sheets

INTERACTIVE ELASTIC LIGHTING FIXTURE

CROSS-REFERENCE TO RELATED APPLICATIONS

This application claims the benefit of U.S. Provisional Application No. 62/348,848 entitled “Interactive Elastic Light Fixture,” filed Jun. 10, 2016, which is herein incorporated by reference in its entirety.

TECHNICAL FIELD

This disclosure relates to artificial lighting, and more specifically, to elongate elastic lighting devices, interactive systems of elongate elastic lighting devices, and related methods of assembly and use.

BACKGROUND

Artificial lighting fixtures are common and important devices in modern society, providing individuals the ability to see indoors and outdoors in all natural lighting conditions. Designers often depend on lighting to not only illuminate a space, but also to set a mood and create an atmosphere within the space. Their ability to do so is currently limited by the characteristics of conventional lighting. Many of the light fixtures used today have evolved little since the invention of the lightbulb. Some of the most common forms of artificial lighting remain lamps and ceiling light fixtures that illuminate a space using one or more conventional light bulbs, such as incandescent, halogen, or compact fluorescent bulbs. Such bulbs are rigid and fragile, inefficient, and may get dangerously hot dining use.

Some designers strive to achieve a particular aesthetic with the help of flexible, elongate lighting systems; however, current options for flexible, elongate lighting systems are also limited. For example, common options include string lighting and rope lighting. String lighting (e.g., patio string lights and holiday lights), include a plurality of small, rigid bulbs connected by a wire. Rope lighting includes an array of small lights encased in a single, flexible tube. The ambiances that can be created with these conventional elongate lighting systems are limited, and experiential, interactive opportunities with these lighting, systems are minimal.

Fiber optics is another example of a flexible, elongate lighting system. In fiber optics, a light source is positioned at a first end of a glass or polymeric fiber, and light travels from the first end of the fiber to a second end. Fiber optic systems are not a common or ideal option for artificial lighting due to the limited amount of illumination they generate. In fact, an objective of fiber optics is to minimize light loss (i.e., illumination along the length of the fiber) in order to transmit signals (i.e., light) with high fidelity from one end of the fiber to the other.

Thus, there is a need for new and improved lighting systems that enable more creative aesthetics and lighting experiences than is possible with conventional lighting solutions.

SUMMARY

There is a need for new and improved lighting systems that enable a user to manipulate and interact with light. There is a need for lighting that is: shape-changing, responsive to touch, cool enough to safely touch while in operation, and configured to provide substantial illumination. The present disclosure provides designs and embodiments that address one or more of these needs.

In particular, the present disclosure provides new and useful artificial lighting devices and systems and related methods of assembly and use. The disclosed artificial lighting devices and systems may be functional and/or decorative in nature.

One aspect of the disclosure is directed to an artificial lighting device. In various embodiments, the artificial lighting device includes an elongate body formed of a tubular sidewall having a channel extending therethrough, the tubular sidewall being formed of a flexible, elastic, and translucent material. The artificial lighting device further includes a light source disposed at or within a proximal end of the elongate body, the light source having a light transmitting portion. In various embodiments, the artificial lighting device is configured for light from the light source to extend through the channel and radiate outward through the tubular sidewall at an angle of 360 degrees such that, along a length of the elongate body, light emanates from the entire circumference of the tubular sidewall.

In various embodiments, the tubular sidewall is bendable, stretchable, and compressible by a user. The artificial lighting device of some embodiments additionally includes an optical lens positioned on or around the light source. The optical lens is configured to focus the light emitted from the light source into the channel of the elongate body. Additionally or alternatively, in some embodiments, the artificial lighting device additionally includes a thermally conductive casing circumferentially surrounding the light source, wherein the thermally conductive casing is configured to serve as a heatsink.

Another aspect of the disclosure is directed to an artificial lighting system. In various embodiments, the artificial lighting system includes an artificial lighting device, such as, for example, the artificial lighting device described above. The artificial lighting system further includes: a first housing coupled to a proximal end of the elongate body, and electronics electrically coupled to the light source and disposed within the first housing. In some embodiments, a second housing is coupled to a distal end of the elongate body. In some such embodiments, the first housing and the second housing together form a frame.

In some embodiments, the artificial lighting system also includes a sensing element configured to generate a movement signal upon sensing a changed state indicative of movement of the elongate body. The changed state indicative of movement may be, for example, a change in orientation, position, or pressure. Such a sensing, element may be coupled to the proximal end of the elongate body or the first housing. In some such embodiments, the sensing element is configured to transmit the movement signal to a processing module, and the processing module is configured to execute a change in a sensory output in response. As non-limiting examples, the change in the sensory output may include at least one of a change between a light-emitting state and a non-light-emitting state, a change in a color of emitted light, a change in light intensity, a change in beam angle, a change between a sound-emitting state and a non-sound-emitting state, a change in an emitted sound, and a change in a vibratory state. Such an artificial lighting system may further include a sound generating device or a vibration generating device.

An additional aspect of the disclosure is directed to a method of assembling an artificial lighting system. The method of various embodiments includes: positioning a receiving port on or in a surface or wall of a first housing; coupling a light source to circuitry, the light source having a light transmitting portion; positioning the light source in the receiving port, the light source oriented such that the light transmitting portion extends outward away from the first housing; positioning the circuitry within the first housing; forming an elongate body comprising a tubular sidewall having, a channel extending therethrough, the tubular sidewall being formed of a flexible, elastic, and translucent material; and connecting a proximal end of the elongate body to the receiving port such that the light source is disposed within the channel at a proximal end of the elongate body. In various embodiments, the assembled artificial lighting system is configured for light from the light source to extend through the channel and radiate outward through the tubular sidewall at an angle of 360 degrees such that, along a length of the elongate body, light emanates from the entire circumference of the tubular sidewall. In some embodiments, the method further includes connecting a distal end of the elongate body to a second housing. In such embodiments, the first housing and the second housing may form portions of a support frame.

A further aspect of the disclosure is directed to a method of interacting with an artificial lighting system. In various embodiments, the method includes manually manipulating an artificial lighting system, such as, for example, any of the artificial lighting systems described above or elsewhere herein. In the various embodiments, manual manipulation of the artificial lighting system causes a tubular sidewall of the artificial lighting system to stretch, compress, or bend. In some embodiments, manual manipulation of the artificial lighting system further causes a processing module of the artificial lighting system to execute a change in a sensory output, such as a visual, auditory, or haptic output.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

FIG. 4 is a photograph depicting a portion of one embodiment of an artificial lighting, device being manipulated and squeezed by a user.

Figure 1:
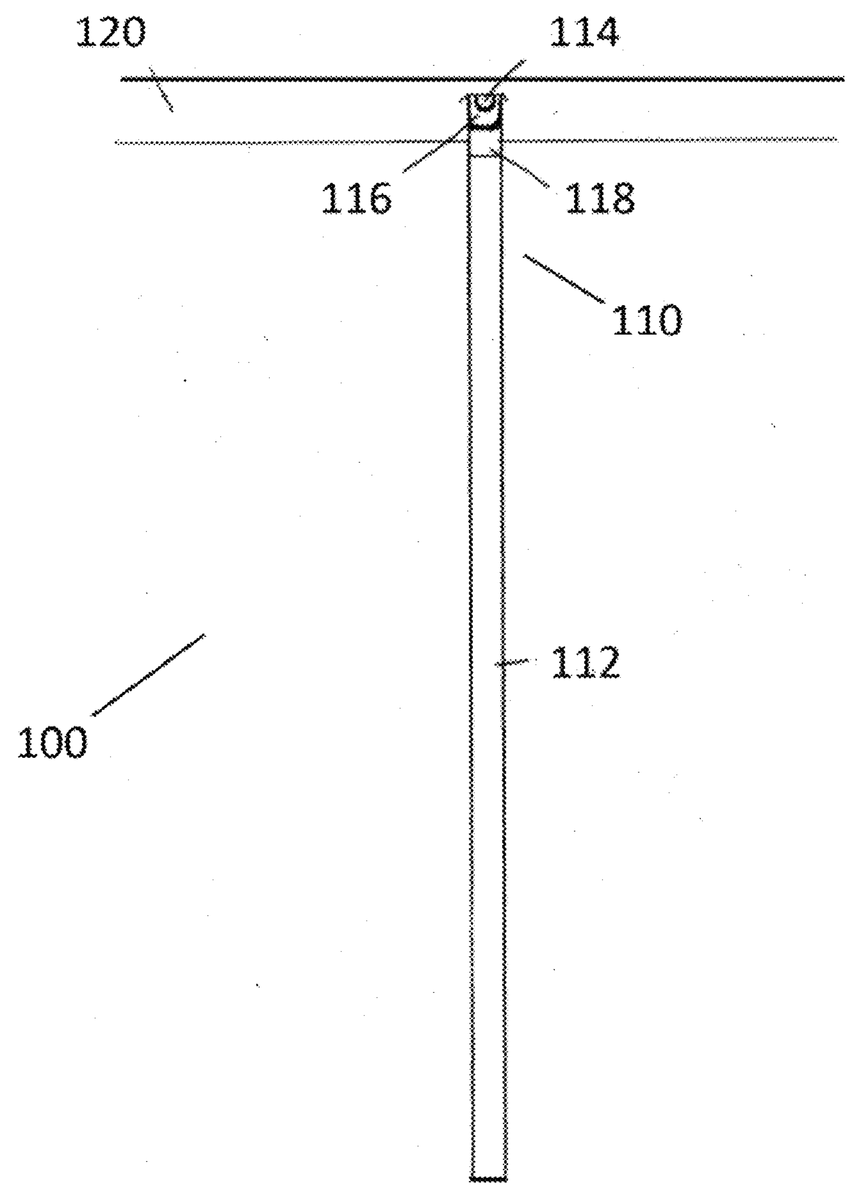
FIG. 1 is a schematic drawing illustrating a partial side view of one embodiment of an artificial lighting system.

The illustrated embodiments are, merely examples and are not intended to limit the invention. The schematics are drawn to illustrate features and concepts and are not necessarily drawn to scale.

DETAILED DESCRIPTION

The following description of the preferred embodiments is not intended to limit the invention to these preferred embodiments, but rather to enable any person skilled in the art to make and use this invention. Other embodiments may be utilized and modifications may be made without departing from the spirit or the scope of the subject matter presented herein. Aspects of the disclosure, as described and illustrated herein, can be arranged, combined, and designed in a variety of different configurations, all of which are explicitly contemplated and form part of this disclosure.

Throughout and within this specification, one or more publications may be referenced to more fully describe the state of the art. The disclosures of any such references are incorporated herein by reference in their entireties as though they also form part of this disclosure.

Disclosed herein are new and useful artificial lighting devices and systems and related methods of assembly and use. The disclosed lighting devices and systems may be functional and/or decorative in nature and may be highly manipulatable and interactive. At least some embodiments of the disclosed lighting devices and systems are shape-changing, responsive to touch, cool enough during use to be safely touched by hand, and configured to provide substantial illumination. Various embodiments disclosed herein are directed to elastic lighting technology that enables users to experience sensations of touching, pulling, altering, bending, pinching, and stretching light.

The disclosed elastic lighting technology, devices, and systems may be used in any lighting design. For example, applications of the disclosed elastic lighting technology, devices, and systems include, but are not limited to, interior lighting fixtures, exterior lighting fixtures, residential and commercial lighting installations, commercial signs and other display structures, displays or interactive experiences at music festivals, museums, or other events or venues, art installations, and large-scale architectural installations.

Definitions

Unless otherwise defined, each technical or scientific term used herein has the same meaning as commonly understood by one of ordinary skill in the art to which this disclosure belongs.

As used in the description and claims, the singular form "a", "an" and "the" include both singular and plural references unless the context dearly dictates otherwise. For example, the term "an artificial lighting device" may include, and is contemplated to include, a plurality of artificial lighting devices. At times, the claims and disclosure may include terms such as "a plurality," "one or more," ort "at least one." however, the absence of such terms is not intended to mean, and should not be interpreted to mean, that a plurality is not conceived.

Unless otherwise specified, the term "about" or "approximately," when used before a numerical designation or range (e.g., to define a luminous flux, a diameter, or a length), indicates approximations which may vary by (+) or (−) 5%, 1%, or 0.1%. All numerical ranges provided herein are inclusive of the stated start and end numbers. The term "substantially" indicates mostly (i.e., greater than 50%) or essentially all of a substance or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed invention. "Consisting of" shall mean that the devices, systems, and methods include the recited elements and exclude anything more than a trivial or inconsequential element or step. Embodiments defined by each of these transitional terms are within the scope of this disclosure.

Embodiments of the disclosed subject matter may be referred to herein individually or collectively by the term "invention" merely for convenience and without intending to voluntarily limit the scope of this application to any single invention or inventive concept, if more than one is disclosed.

As used herein, "proximal" and "distal" are relational terms describing, opposing ends of a component or device. Specifically, as used herein, a proximal end of an elongate body refers to the end that is proximate or closest to a light source; the distal end is the opposing end.

As used herein, "tubular" refers to any three-dimensional shape having a channel or lumen disposed therein. For example, tubular may refer to a cylindrical tube or any other hollow three-dimensional shape such as, for example, a hollow cone, tetrahedron, triangular prism, rectangular prism, other polyhedron, or sphere.

Systems and Devices

Various interactive, elastic lighting devices and systems are disclosed herein. As shown in FIG. 1, in one embodiment, a lighting system 100 includes a lighting device 110, a housing 120, and wiring and electronics (not shown).

The lighting device 110 includes an elongate body 112, which is formed of a tubular sidewall having a channel extending therethrough. The tubular sidewall is flexible, elastic, and resilient, making it deformable, bendable, stretchable, and compressible (i.e., squeezable). Such a sidewall can be physically manipulated, for example, mechanically or manually by a user. The tubular sidewall s also transparent, enabling side glow along a length of the sidewall. As used herein, "side glow" refers to the outward emanation of light from a circumference of the tubular sidewall. In some embodiments, the tubular sidewall is formed of a transparent latex, silicone, or rubber. In some embodiments, the tubular sidewall is formed of one or more transparent and elastic polymers or other suitable materials.

The lighting device 110 also includes a light source 114. In some embodiments, the light source 114 has a first end that is coupled to wiring and electronic components and, a second end that includes a light transmitting portion. The light source 114 is disposed within a proximal end of the elongate body 112 and positioned such that the light source 114 is axially aligned with an axis of the elongate body 112. The light source 114 is further oriented such that the light transmitting portion of the light source 114 is pointed towards a distal end of the elongate body 112, thereby directing light through the channel of the elongate body 112. In some embodiments, the light transmitting portion emits a 180 degree beam of light into the elongate body 112. Any suitable light source may be used. The light source 114 should be relatively efficient such that a limited amount of heat is generated. In some embodiments, the light source 114 is a solid-state lighting component, such as a light emitting diode or a light emitting plasma.

The wiring and electronics may be any suitable wiring and electronics known now or in the future to those skilled in the art. For example, in some embodiments, the light source 114 is connected to a printed circuit board (PCB) directly or electrically connected via one or more wires. Various electrical components needed to drive and regulate power transmission and light generation are disposed on or in the PCB. Such components include, for example, a processing module, one or more drivers, one or more resistors, and one or more capacitors. While present, the wiring and electronics are not visible in FIG. 1, because they are positioned inside of the housing 120.

Optionally, in some embodiments, such as the embodiment depicted in FIG. 1, the lighting device 110 further includes an optical lens 116 positioned on or around the light source 114. In some embodiments, the optical lens 116 forms or defines the light transmitting portion of the light source 114. The optical lens 116 is configured to focus the light emitted from the light source 114 into the channel of the elongate body 112. For example, in some embodiments, the light emitted from the light source 114 is focused by the optical lens 116 to an emission angle of 10 to 180 degrees. In some embodiments, the optical lens 116 focuses the emission angle between 45 and 180 degrees, in some embodiments, the optical lens has an adjustable aperture, such that, upon receiving a signal (as discussed in more detail below), the optical lens is configured to narrow or expand the emission angle.

Various embodiments of the lighting device 110 are configured to emit light at an angle of 360 degrees along the length of the elongate body 112 such that light is emitted from the entire circumference of the tubular sidewall. In some embodiments, the light source 114 (and optical lens 116, if present) is configured to achieve an intensity of light emission that is approximately constant (for example, varying by no more than 1%, 5%, 10%, 20%, or 30%) along the entire length and around the entire circumference of the elongate body 112. In various embodiments, the luminous flux of the light source 114 is selected based on the length and diameter of the elongate body 112 to ensure that a sufficient amount of light is generated to achieve adequate light emission along the entire length and around the entire circumference of the elongate body 112. In one non-limiting embodiment, the light source 114 emits a luminous flux, of at least 110 lumens.

Optionally, in some embodiments, such, as the embodiment depicted in FIG. 1, the lighting device 110 further includes a thermally conductive casing 118 circumferentially surrounding the light source 114. The thermally conductive casing 118 is configured to serve as a heatsink. The casing 118 may be formed of any suitable thermally conductive material, in some embodiments, the casing 118 is formed of copper, aluminum, silver, gold, another thermally conductive material, or a composite thereof. In some embodiments, a casing 118 is included when a relatively less efficient light source 114 is used in order to ensure that the lighting device does not get too hot. In some embodiments, the light source 114, tubular sidewall material, and optional casing material are selected such that the outer circumference of the tubular sidewall does not exceed a temperature of 120 degrees Fahrenheit when in use. In other embodiments, the lighting device 110 is configured such that the outer circumference of the tubular sidewall does not exceed a temperature of 110 degrees, 100 degrees, 90 degrees, or 80 degrees Fahrenheit when in use. In various embodiments, the lighting device 110 is configured such that the outer circumference of the tubular sidewall maintains a temperature that is safe and comfortable for a user to interact with and touch.

In various embodiments, such as the embodiment of FIG. 1, the lighting system 100 additionally includes a housing 120. The housing 120 is coupled to the proximal end of the elongate body 110. In various embodiments, the housing functions as a support structure to hold at least the proximal end of the elongate body 110 in place. The housing may be hollow or substantially hollow and configured to surround, protect, and hide the system's wiring and electronics. In some embodiments, the light source 114, the optical lens 116 (if present), and/or the casing 118 (if present) are disposed within or attached to the housing 120. The housing 120 may be made of metal, wood, plastic, or, any other desirable material and may be a tube, box, or any ether suitable structure. The housing 120 may be any desired size and shape so long as the interior of the housing 120 is large enough to house the wiring and electronics of the system.

Figure 2:
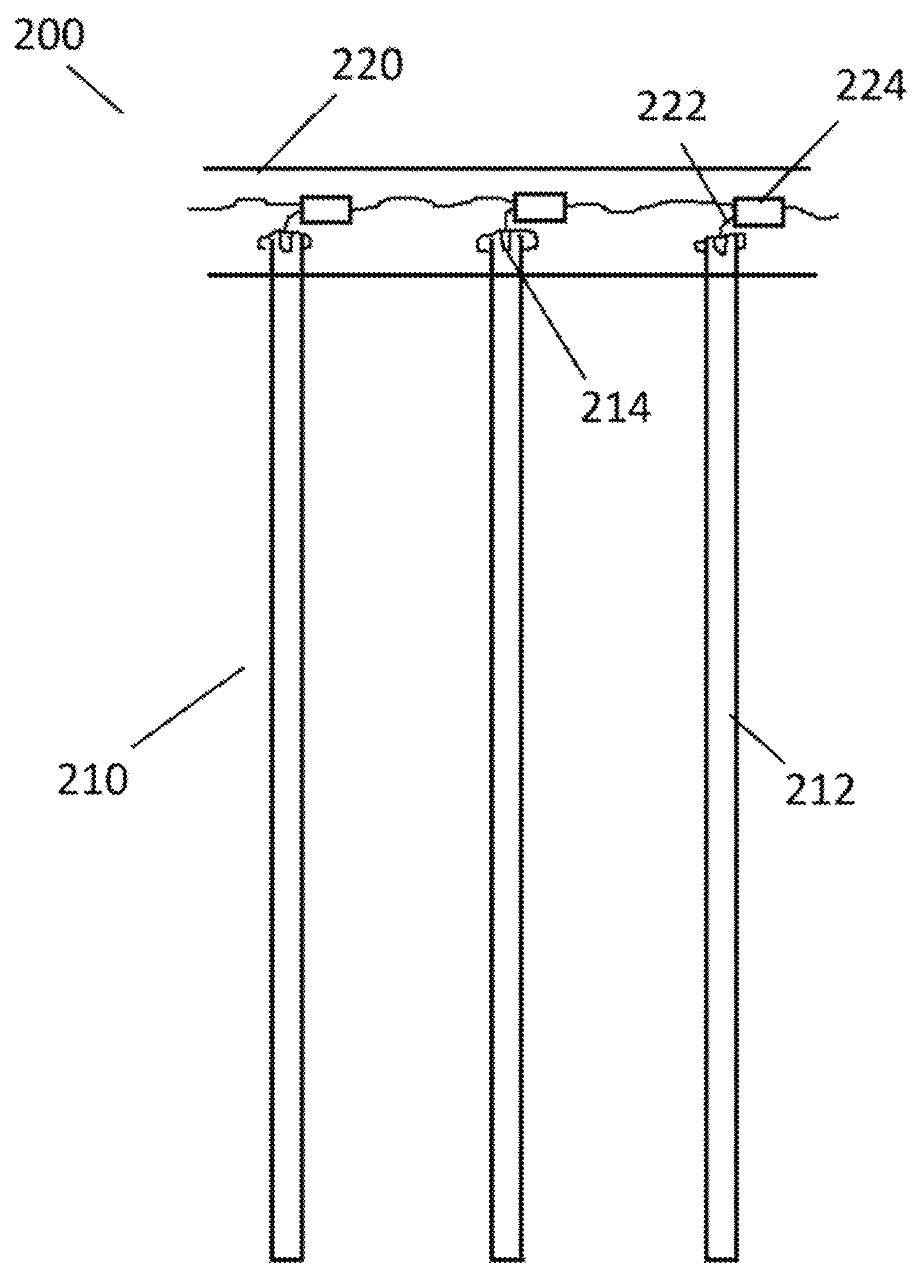
FIG. 2 is a schematic drawing illustrating a partial side view of another embodiment of an artificial lighting system.

Another embodiment of a lighting system 200 is depicted in FIG. 2. In some embodiments, such as the embodiment of FIG. 2, the lighting system 200 includes a plurality of lighting devices 210 attached to the housing 220. Any desired number of lighting devices 210 may be included, for example, 2, 3, or 4 lighting devices or as many as 100 lighting devices or more may be provided. The lighting devices 210 may be arranged in a row or in any other regular or random arrangement. In some embodiments, each lighting device 210 of the lighting system 200 includes an elongate body 212, a light source 214, and its own wiring 222 and circuitry. Each light source 214 of FIG. 2 is shown connected to its own PCB 224. Optionally, the plurality of lighting devices 210 may be electrically coupled together to coordinate operation between two or more of the lighting devices 210. In some such embodiments, some or all operations may be executed by a shared processing module. Optionally, each lighting device 210 may also include one or both of an optical lens and a thermally conductive casing, although neither is depicted in the embodiment of FIG. 2. The various components of the lighting system 200 may have any of the characteristics described above with reference to FIG. 1.

As described above, the lighting devices and systems of various embodiments are highly manipulatable and interactive. In various embodiments, the lighting devices provide substantial illumination while also being shape-changing. Light extends through the channel of the elongate body creating a channel of light that emanates outward from the sidewalls of the device, creating substantial side glow. Accordingly, when in use, these lighting devices appear as glowing tubes or strands of light, and provide users with the sensation of touching, pulling, altering, bending, pinching, and/or stretching light.

Figure 3A:
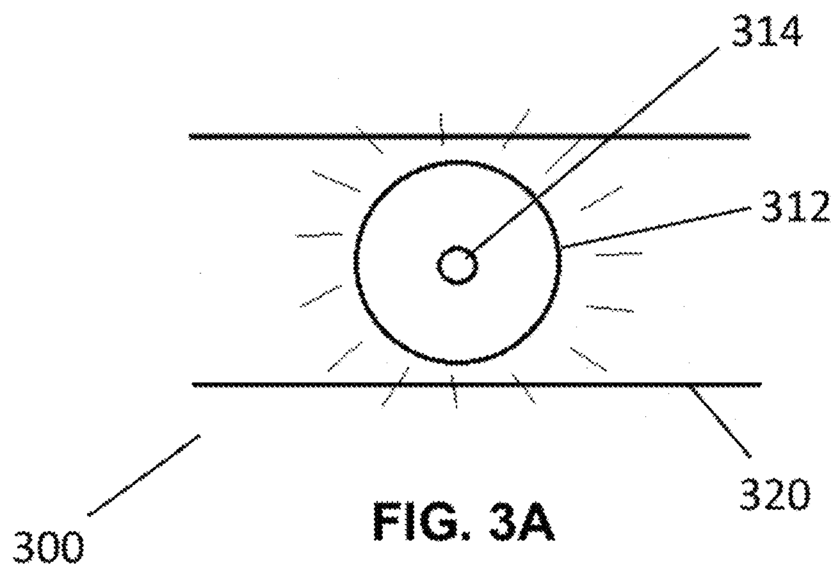
FIG. 3A is a schematic drawing illustrating a distal view of a portion of one embodiment of an artificial lighting system.

FIG. 3A schematically depicts a distal view of a portion of a lighting system 300, which includes an elongate body 312, a light source 314, and a housing 320. The light source 314 is axially aligned with the elongate body 312 and disposed within the proximal end of the elongate body 312. The beam angle of the light source and the diameter of the transparent tubular sidewall of the elongate body 312 are selected such that light hits and is transmitted through an entirety of the tubular sidewall. As shown by the schematic rays of light, side glow is achieved around an entire circumference (i.e., 360 degree angle) of the tubular sidewall.

Figure 3B:
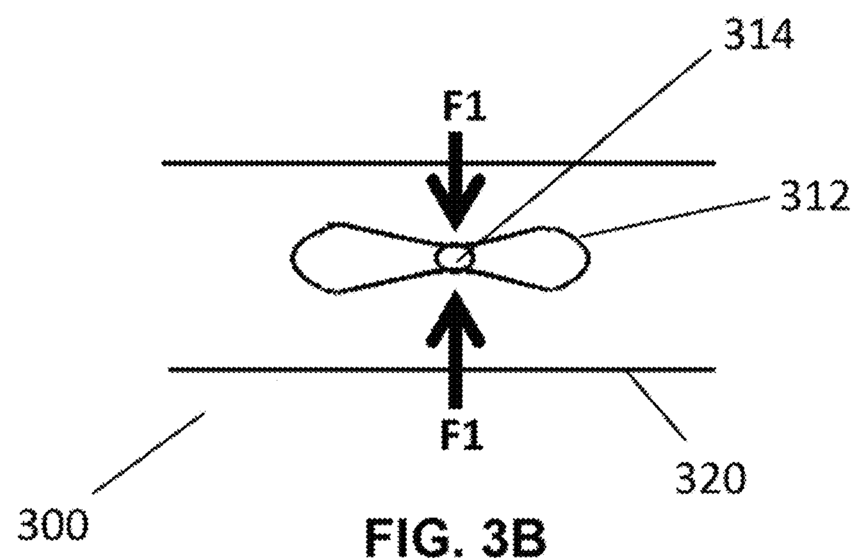
FIG. 3B is a schematic drawing illustrating a distal view of a portion of the artificial lighting system embodiment of FIG. 3A, wherein an elongate body of the system is in a compressed configuration.

FIG. 3B schematically depicts a distal view of the lighting system 300 as a compression force F1 is applied across a diameter of the tubular sidewall. As illustrated, the flexible, elastic, and resilient tubular sidewall deforms in response to the applied force. In various embodiments, the tubular sidewall returns to its original shape when the application of force is removed.

FIG. 4 also depicts an example of a tubular sidewall of a lighting device as it is being subjected to a compression force. In particular, opposing sides of a tubular sidewall are being squeezed or pinched together by a user. As shown, when the channel defined by the tubular sidewall is occluded, such as occurs when opposing sides of the sidewall are fully pinched together, light is not able to pass through the occluded portion. In such situations, light continues to be emitted in a 360-degree manner from the tubular sidewall in the portion that is proximal to the occlusion (i.e., from the light source side of the occlusion), but little or no light is emitted distal to the occlusion. In this manner, a user can manipulate where a beam of light ends simply by using their fingers.

Figure 5:
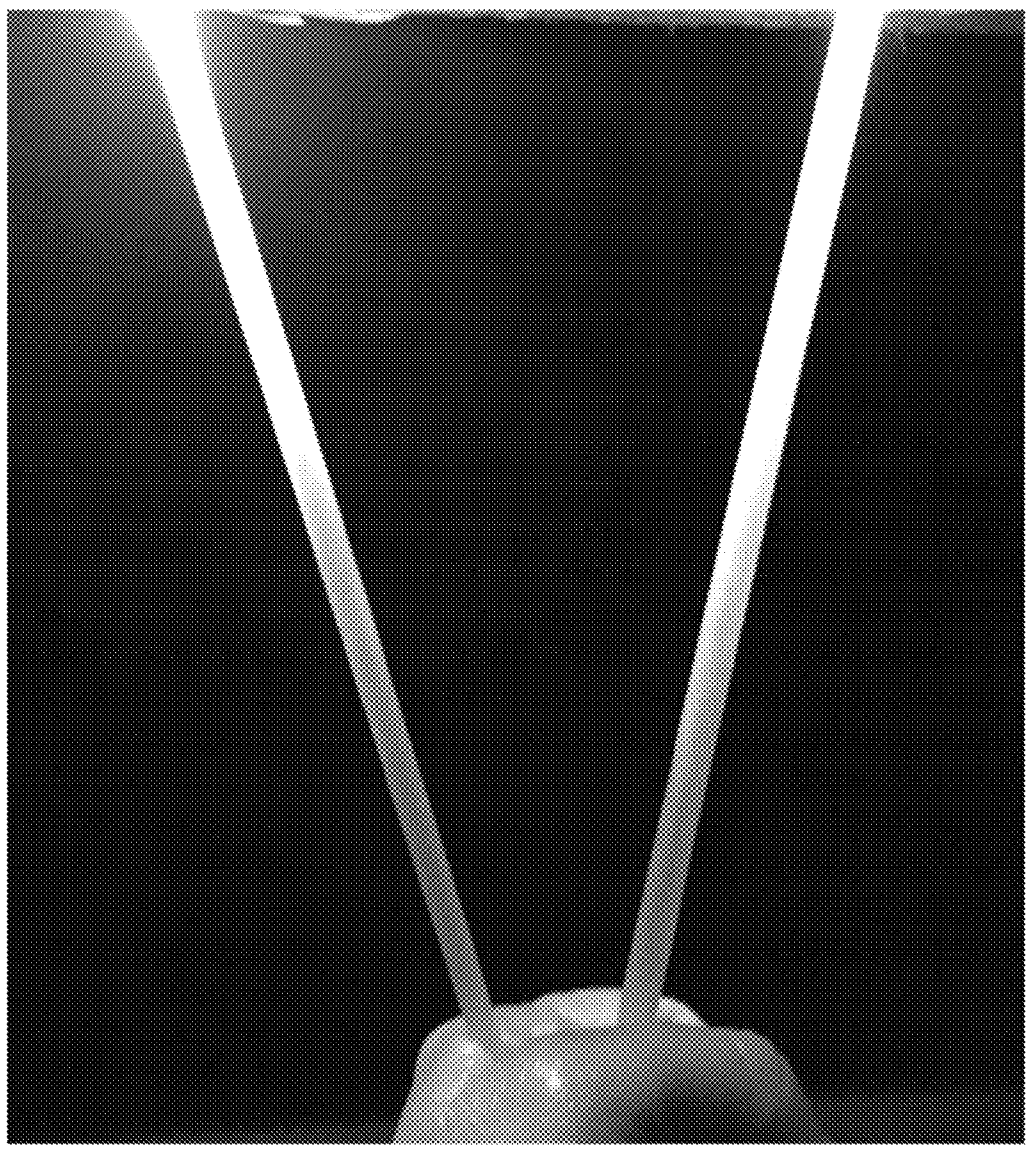
FIG. 5 is a photograph depicting a portion of one embodiment of an artificial lighting system being pulled and stretched by a user.

FIG. 5 depicts an example of a tubular sidewall of a lighting device as it is being subjected to a tensile force. In particular, a user is pulling on distal ends of two lighting devices of a lighting system. The tubular sidewalls are being pulled downward and at an angle. As shown, the tension causes the tubular sidewall is to stretch and deform. The diameter of the tubular sidewall narrows as the length increases. In some such embodiments, the light emitted from the tubular sidewall (i.e., the side glow) decreases along the length of the elongate body as the diameter narrows. In various embodiments, the tubular sidewall returns to its original shape when the application of force is removed.

Figure 6:
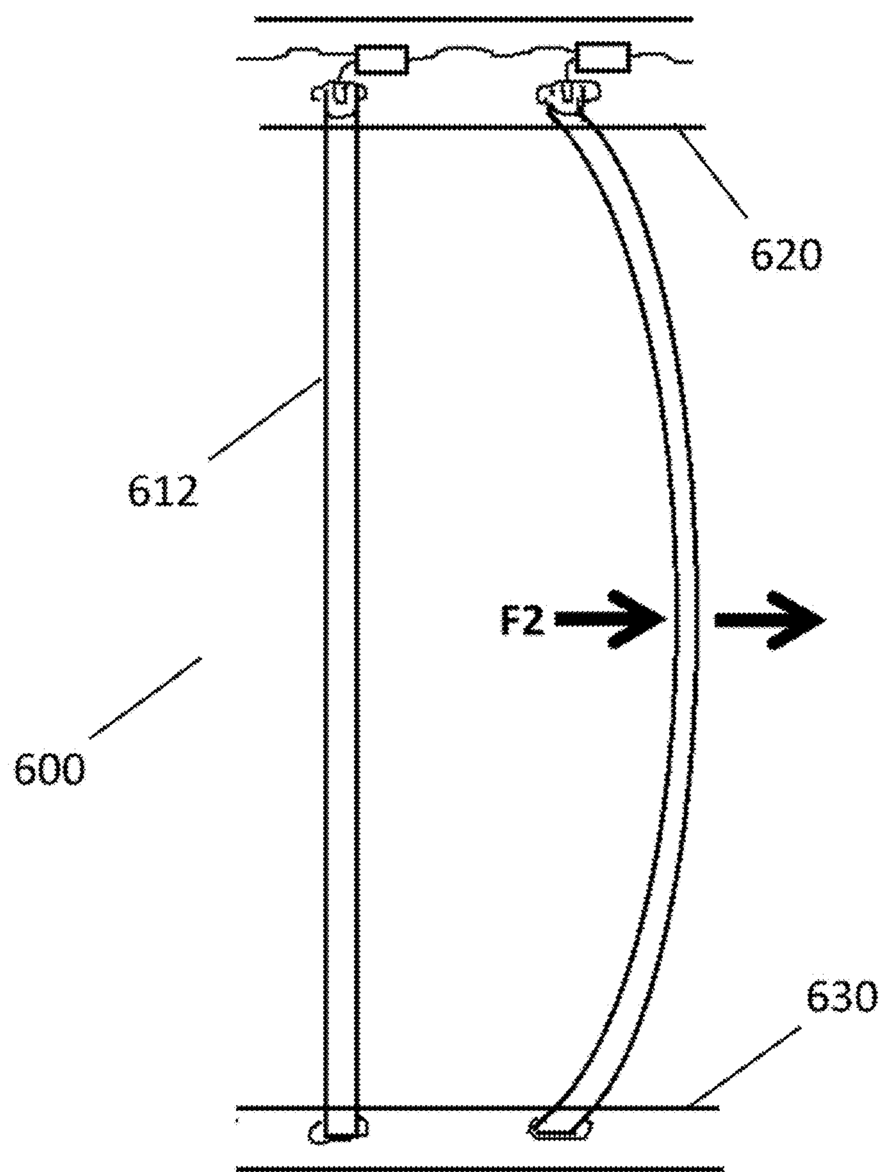
FIG. 6 is a schematic drawing illustrating a partial side view of another embodiment of an artificial lighting system, wherein an elongate body of the system is being deflected by a force.

Other manipulations of the light are possible. For example, as shown in FIG. 6 the tubular wall of various embodiments can be pulled, stretched, and bent. In the embodiment of FIG. 6, the lighting system 600 includes a plurality of lighting devices having, elongate bodies 612 that are attached to a first housing 620 at their proximal ends and to a second housing 630 at their distal ends. The wiring and circuitry for the light source is disposed within the first housing 620. The second housing 630 acts as a further support structure and need not be (but can be) hollow. As described in more detail below, in some embodiments, wiring and circuitry for an interaction module is provided in the second housing 630. In such embodiments, the second housing 630 is substantially hollow. The second housing 630 may be formed of metal, wood, plastic, or any other suitable material. With both ends of the elongate body 612 attached to a support structure, the application of a pushing or pulling force F2 on a side of the elongate body 612 causes the tubular sidewall to stretch and bend. In some embodiments, the tubular sidewall returns to its original shape when the application of force is removed. The second housing 630 depicted in FIG. 6 may also be present in any of the other system embodiments described herein. Alternatively, in the systems presented above, the elongate bodies may freely hang at the distal end. In some such embodiments, a weight may be provided at the distal end to pull the elongate bodies downward.

Figure 7:
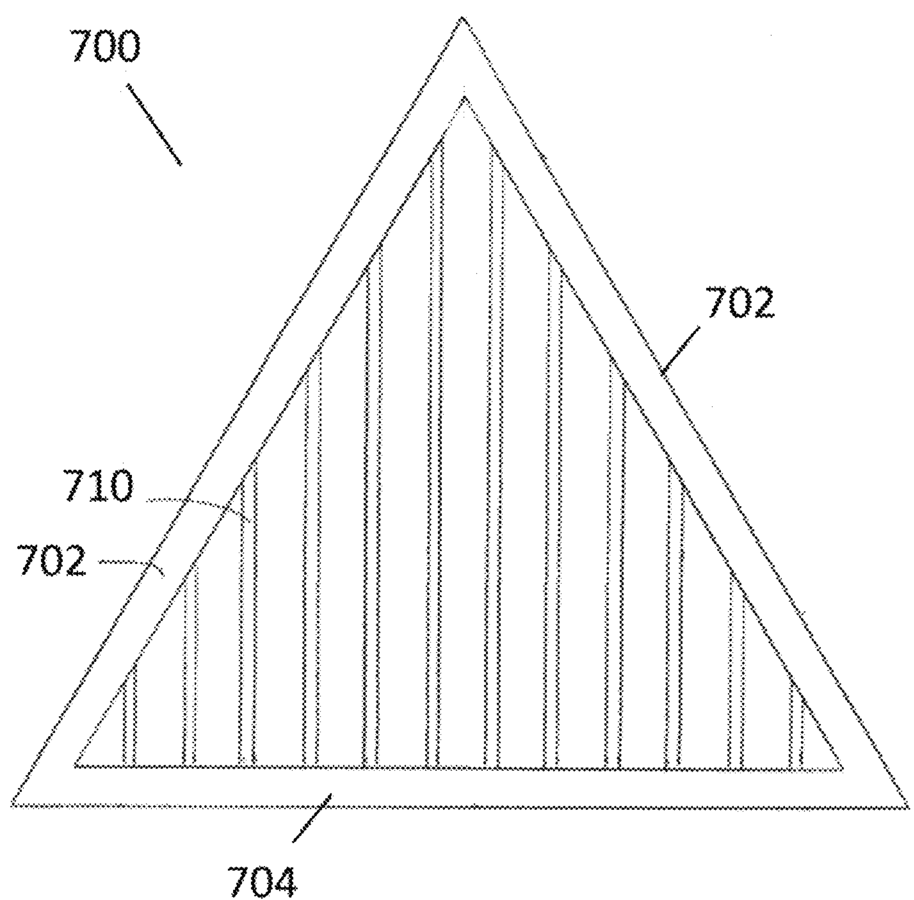
FIG. 7 is a schematic drawing illustrating, a side view of one embodiment of an artificial lighting system.

In some embodiments, the first housing 620 and second housing 630 form portions of the same structure, providing a support frame for the lighting system 600. For example, one non-limiting example of a system 700 having a support frame is depicted in FIG. 7. The support frame includes a first housing 702 coupled to proximal ends of the elongate bodies 710 and a second housing 704 coupled to distal ends of the elongate bodies 710. The support frame of the depicted embodiment is shaped as a triangle; however, one skilled in the art will appreciate that the frame may be formed of any desired shape. Such a support frame may be present of the embodiments described above.

Figure 8A:
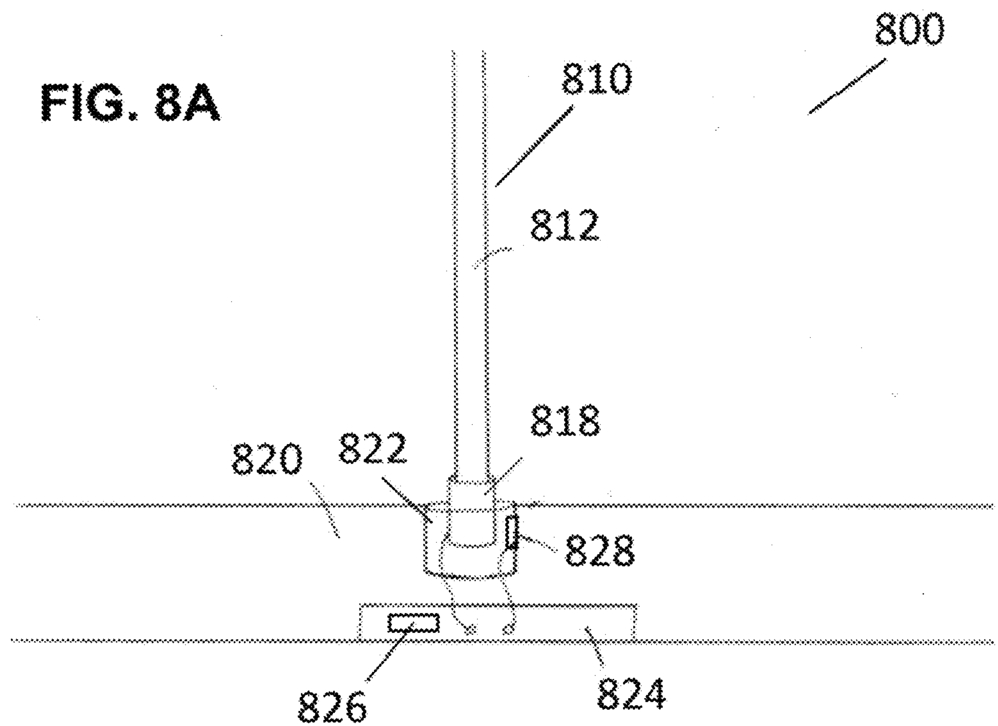
FIG. 8A is a schematic drawing illustrating a partial side view of another embodiment of an artificial lighting system.
Figure 8B:
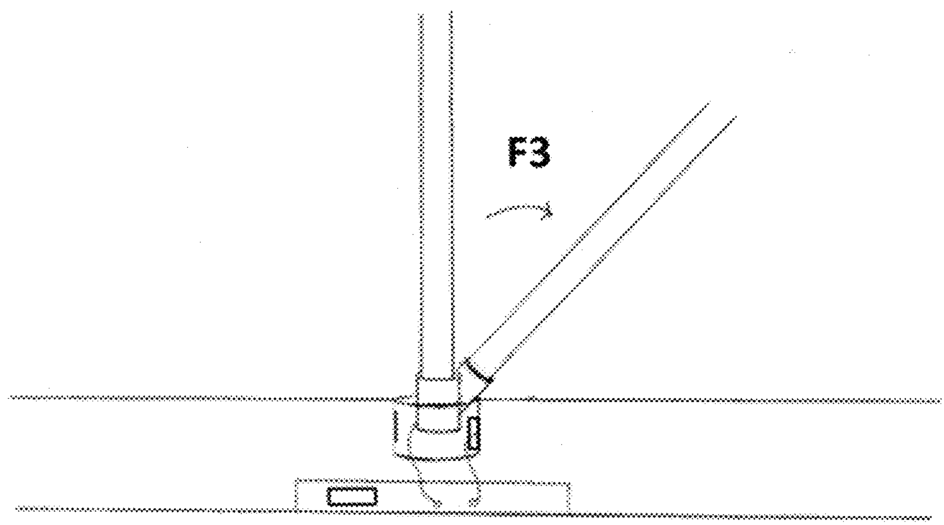
FIG. 8B is a schematic drawing illustrating a partial side view of the artificial lighting system embodiment of FIG. 8A, wherein an elongate body of the system is being deflected by a force.

In some lighting system embodiments, for example, in the lighting system 800 of FIGS. 8A-8B, an interaction module is provided to generate an even greater interactive experience for a user. Such embodiments may include some of or all the features and components of the lighting systems described elsewhere herein. For example, the lighting system 800 includes a lighting device 810 formed of an elongate body 812 and a light source. The light source is in the proximal end of the elongate body 812; thus, it is not visible in FIG. 8, which depicts a distal portion of the lighting system 800.

An end casing 818 is coupled to a distal end of the elongate body 812. The end casing 818 is positioned within, and securely attached to, a receiving port 822 formed within a surface of the second housing 820. A wire or other electrical connection electrically couples the end casing 818 to the circuitry on the PCB 824. In one non-limiting, example, a wire is soldered or otherwise connected to the casing 818, and the casing 818 is securely fitted around the exterior of the distal end of an elongate body 812. In one non limiting example, the casing fits securely within a receiving port 822, which is drilled or otherwise formed within a surface of the housing. In some embodiments, the receiving port 822 is sized to be slightly larger than the casing 818 such that the casing 818 and a sidewall of the receiving port 822 come into contact when the elongate body 812 is deflected.

The interaction module of the lighting system 800 includes a processing module 826 and a sensing element 828. In embodiments comprising a plurality of lighting devices 810, each lighting device 810 is provided with its own processing module 826 an sensing elements 828. The processing module 826 of some embodiments is positioned on the PCB 824 and programmed to execute an interactive experience. The sensing element 828 is coupled to the casing 818 or the receiving, port 822. The sensing element 828 is configured to sense a parameter indicative of movement of the elongate body 812 and generate a movement signal. The sensing element 828 is electrically coupled to the PCB 824, for example, via a wire, so that the movement signal can be transmitted to the processing module 826.

In some embodiments, the sensing element 828 comprises one or more of: a gyroscope configured to detect a change in orientation of the distal end of the elongate body 812; a pressure sensor configured to sense shifts in pressure exerted by the distal end of the elongate body 812 on the housing 820; or a mechanical switch that is triggered when the distal end of the elongate body 812 is deflected from an initial position, for example, due to the application of a force F3.

In some embodiments, the processing module 826 is configured to command a change in a sensory output in response to receiving a movement signal. The sensory output may be a visual, auditory, olfactory, or haptic output. In some such embodiments, the system 800 further includes a noise generating component, a scent generating component, or haptic generating component electrically coupled to the processing module 826. In such embodiments, upon receiving the movement signal, the processing module 826 may generate a command to a connected sensory device to change its sensory output. In some embodiments, the change in the sensory output may include at least one of: a change between a light-emitting state and a non-light-emitting state, a change in a color of emitted light, a change in light intensity, a change in beam angle, a change between a sound-emitting state and a non-sound-emitting state, a change in an emitted sound, and a change in a vibratory state. In one non-limiting example, detected deflection or other movement of the elongate body triggers the light source to turn on or off to begin or terminate the emission of light. In another non-limiting example, a plurality of different color light sources are disposed within the proximal end of the elongate body and detected movement of the elongate body triggers one light source to switch on and another light source to switch oft changing the color of the emitted light. In another non-limiting embodiment, a color filter is positioned over the light transmitting portion of the light source, and movement detection triggers an automated device to exchange filters, thereby changing the color of the emitted light. In another non-limiting example, movement detection triggers the optical lens of the lighting device to automatically adjust an aperture, thereby changing the beam angle. In another non-limiting example, a sound generating device is communicatively coupled to the lighting device, and movement detection triggers the sound generating device to start emitting a noise, stop emitting a noise, or change the noise being emitted. For example, in the lighting system of FIG. 7, each strand or elongate body of the system may act as a string of an instrument such that when a strand is, pulled or plucked, a tone is emitted. Each strand may elicit a differently-pitched tone, when plucked. In another example, movement detection ma trigger a sound generating device to emit pre-recorded music, an announcement, or other information, in another non-limiting example, a display device is communicatively coupled to the lighting device, and movement detection triggers the display device to turn on, turn off, or change an image displayed. In another non-limiting example, a smell-producing device is communicatively coupled to the lighting device, and movement detection triggers the display device to turn on, turn off, or change an emitted smell. In another non-limiting example, a piezoelectric component or other vibration-generating device or other haptic device is communicatively coupled to the lighting device, and movement detection triggers the haptic device to turn on, turn off, or change modes. In one such example, movement of the lighting device from a user's touch may cause the lighting device to vibrate so that the lighting device appears to quiver or shake.

Various embodiments of the lighting devices and systems described above include one or more processing modules. For example, a processing module is provided at a proximal end to control the light source, and in some embodiments, a processing module is also provided at a distal end to control an interaction module. Each processing module may include a combination of hardware and software. One skilled in the art will appreciate that many different structural components and architectures may be used to achieve the functionality of the processing module. Thus, the module will be described in functional terms. Although described separately, it is to be appreciated that the various functional components of the processing module need not be separate structural elements. For example, in various embodiments, the processing module includes, at least, a processor in data communication with memory and an interface, and these components may be embodied in a single chip or two or more chips.

The processor may be a general purpose microprocessor, a digital signal processor (DSP), a field programmable gate array (FPGA), an application specific integrated circuit (ASIC), or other programmable logic device, or other discrete computer-executable components designed to perform the functions described herein. The processor may also be formed of a combination of computing devices, for example, a DSP and a microprocessor, a plurality of microprocessors, one or more microprocessors in conjunction with a DSP core, or any other suitable configuration.

In various embodiments, the processor is coupled, via one or more buses, to the memory in order to read information from and write information to the memory. The processor may additionally or alternatively contain memory. The memory can include, for example, processor cache. The memory may be any suitable computer-readable medium that stores computer-readable instructions for execution by computer-executable components. For example, the computer-readable instructions may be stored on one or a combination of RAM, ROM, flash memory, EEPROM, hard disk drive, solid, state drive, or any other suitable device. In various embodiments, the computer-readable instructions include software stored in a non-transitory format. The processor, in conjunction with the software stored in the memory, executes an operating system and stored software applications. Various methods and operations described elsewhere herein may be programmed as software instructions stored in the memory.

The interface of some embodiments is a wireless network interface configured to communicate with wirelessly coupled, external devices, such as an externally located sensory output device. The wireless interface includes a receiver and/or a transmitter. The receiver receives and demodulates data received over a communication network. The transmitter prepares data according to one or more network standards and transmits data over a communication network. Additionally or alternatively, in some embodiments, the interface is a databus for sending and/or receiving data to one or more components via a wired connection.

Methods of Manufacture and Assembly

Figure 9:
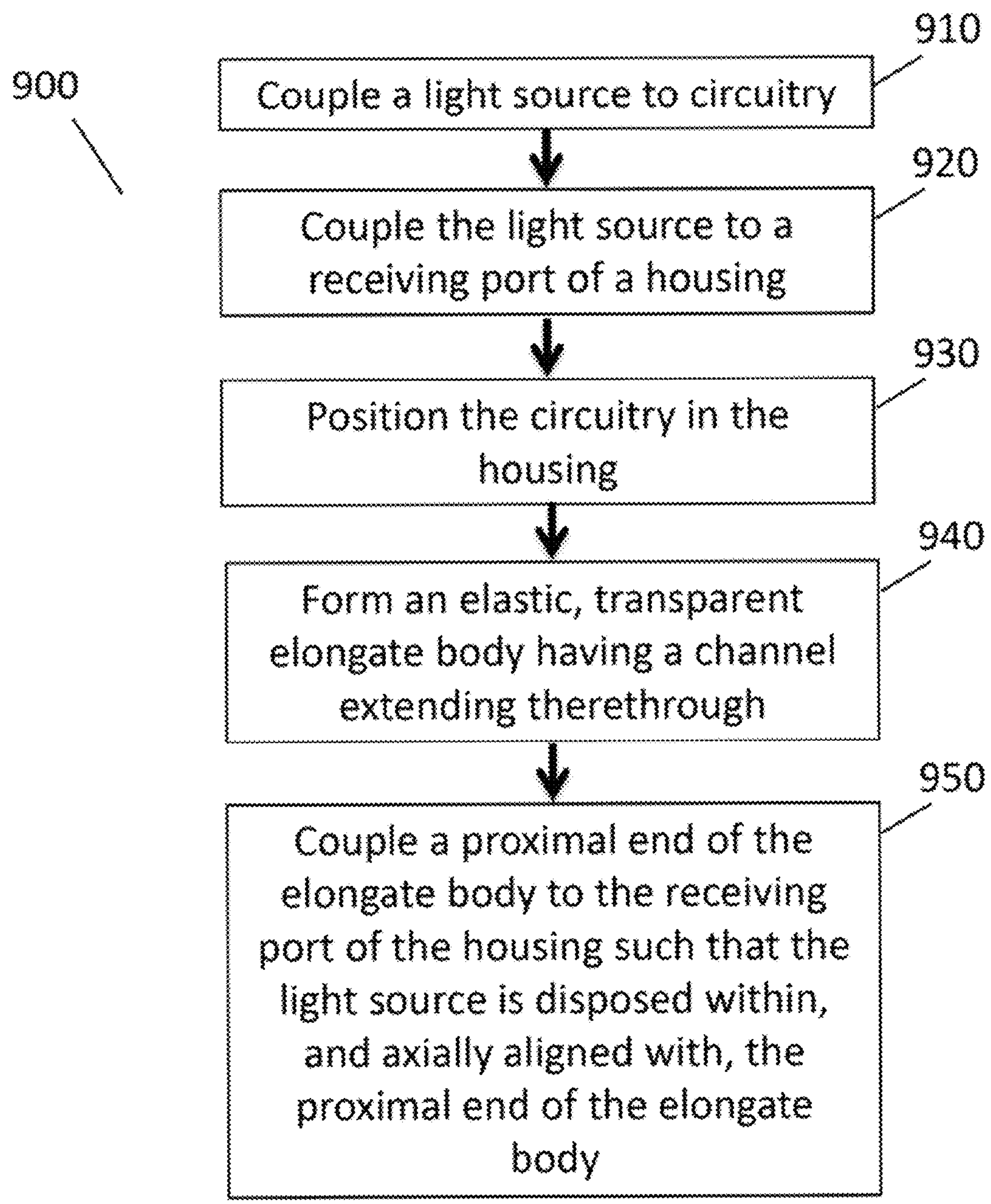
FIG. 9 is a flow chart illustrating one embodiment of a method of assembling an artificial lighting system.

The lighting devices and systems described above may be manufactured and assembled using any suitable methods and techniques. In one non-limiting example of a method 900, as depicted in FIG. 9, a light source is coupled to circuitry at block 910, the light source is also coupled to a housing at block 920, and the circuitry is positioned within the housing at block 930. An elongate body formed of a tubular sidewall having a channel extending through it is funned (at block 940) and coupled to the housing (at block 950). The tubular sidewall of the elongate body is formed of a flexible, elastic, and translucent material, and it may be formed via molding, extruding, 3-D printing, or other suitable techniques. The elongate body is oriented such that a proximal end of the elongate body is attached to the housing, at least a light transmitting portion of the light source is disposed within the proximal end of the elongate body, and the light source is axially aligned with the elongate body. When the components of the system are coupled together, the system is configured for light from the light source to extend through the channel and radiate outward through the tubular sidewall at an angle of 360 degrees such that, along a length of the elongate body, light emanates from the entire circumference of the tubular sidewall.

In some embodiments, additional components, such as an optical lens, a thermally-conductive casing, and/or a movement sensing element may be added to the assembly. The optical lens may be positioned within the channel of the elongate body over the light source to define the light transmitting portion. The thermally-conductive casing may be positioned circumferentially around the light source. In some embodiments, the thermally-conductive casing is securely fitted around an exterior of the proximal end of the elongate body.

In some embodiments, a distal end of the elongate body is coupled to a second housing. In some such embodiments, an end casing is fitted to the distal end of the elongate body and the end casing is secured to a receiving port on or in a surface of the second housing. A movement sensing element may be attached to, or positioned within, the casing or the receiving port. A processing module may be electrically coupled to the movement sensing element and positioned within the second housing. The second housing may be integrally coupled to the first housing. For example, in some embodiments, the proximal end of the elongate body is attached to a first portion of a support flame (i.e., the first housing) and the distal end of the elongate body is attached to a second portion of the same support frame (i.e., the second housing).

To facilitate attachment of the lighting device to housing at one or both ends of the lighting device, a receiving port (e.g., a hole, cup, cutout, or depression) may be formed within the first and/or second housing. This receiving port may be added to an existing housing, for example, through drilling or carving. Alternatively, the receiving port may be included in a mold or pattern used when building the housing (e.g., via 3D printing or injection molding). In some embodiments, the receiving port is sized to snuggly receive an end of the elongate body or a casing attached thereto. In some embodiments, the receiving port includes features such as threading or snap-fit features to securely couple the receiving port to one or more attached components. In one example, the receiving port and a casing have complementary mating features.

Any suitable means may be used to connect the various components together. For example, the light source may be embedded within a wall of the first housing or attached to the first housing using an adhesive, complementary mating features, soldering, nuts, bolts, screws, or other attachment mechanisms. Similarly, the elongate body, optional lens, optional casing, light source, and wiring may be securely attached to one or more of each other using an adhesive, complementary mating features, soldering, nuts, bolts, screws, or other attachment mechanisms. In one embodiment, the light source is affixed to a PCB, and the PCB is placed within a hollow interior of the housing with the light source protruding out of a hole sized to accommodate the light source but not the PCB.

Various components of the system may be any size and shape suitable for a particular lighting project. For example, the elongate body may be formed to have any suitable diameter and length. In some embodiments, the diameter may be between ⅛ inch and 36 inches. In some embodiments, the diameter is between ⅛ inch and 4 inches. In one embodiment, the minimum suitable diameter is ⅛ inch. In one embodiment, the minimum length of the elongate body is six inches. In some embodiments, the system is sized so as to fit in the hand of a user. In other embodiments, the system is substantially larger. For example, in one non-limiting embodiment, the system forms a two-story chandelier.

Methods of Interaction and Use

As described above, the elastic, lighting technologies, devices, and systems provided herein may be used in a variety of settings and fir a variety of purposes. The devices and systems may be used for aesthetic and/or functional purposes. For example, the devices and systems may be used to decorate and illuminate an indoor or outdoor space. They may be used for commercial purposes such as for interactive advertisements. They may be used to create 3-dimensional interactive and immersive environments for transmitting alerts or other information or to create 3-dimensional interactive and immersive art exhibits or architectural installations.

Figure 10:
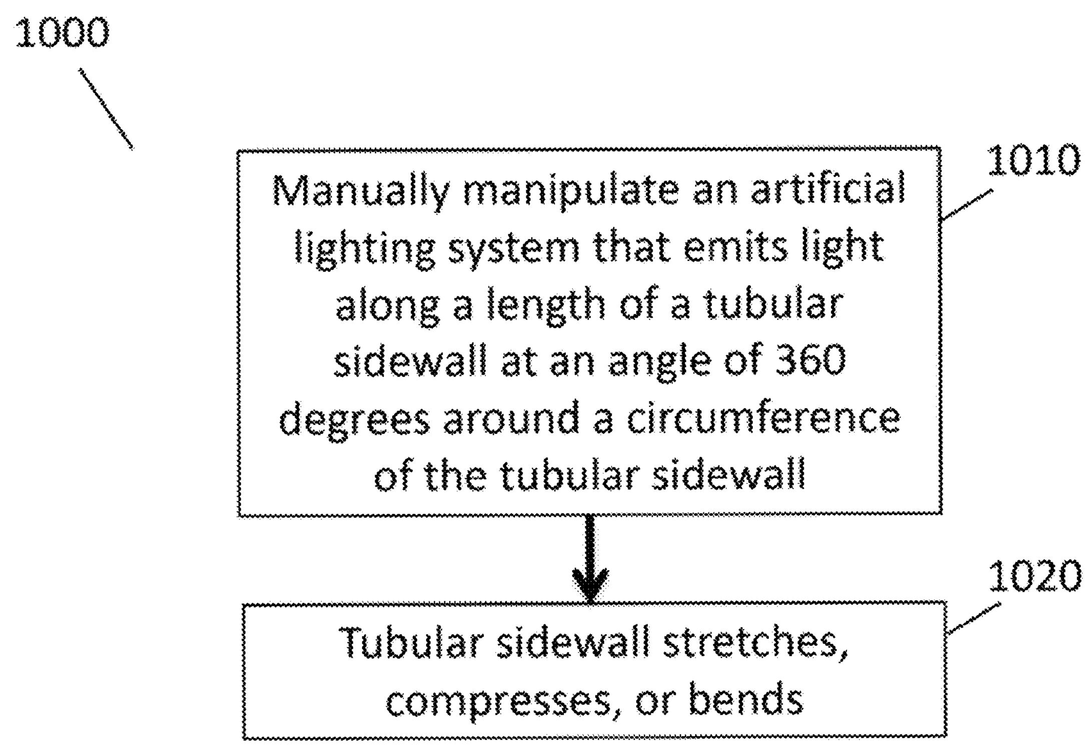
FIG. 10 is a flow chart illustrating one embodiment of a method of using, or interacting with an artificial lighting system.

In one non-limiting embodiment, a method 1000 of interacting with a lighting system includes manually manipulating the lighting system, as shown at block 1010 of FIG. 10. The lighting system may comprise any of the lighting system embodiments described elsewhere herein. Iii various embodiments, manual manipulation of the lighting system by a user causes the tubular sidewall of the system to stretch, compress, or bend, as shown at block 1020. Such a method may provide users with the sensations of touching, pulling, altering, bending, pinching, and stretching light. In some embodiments, manual manipulation of the lighting system causes a processing module of the lighting system to command a change in a sensory output, such as a visual, auditory, olfactory, or haptic output. Such a change may include, for example: a change between a light-emitting state and a non-light-emitting state, a change in a color of emitted light, a change in light intensity, a change in beam angle, a change between a sound-emitting state and a non-sound-emitting state, a change in an emitted sound, and/or a change in a vibratory state. Such changes are described in more detail above.

The examples described herein show, by way of illustration and not of limitation, specific embodiments in which the subject matter may be practiced. Other embodiments may be utilized and derived therefrom, such that modifications may be made without departing from the scope of this disclosure. This disclosure is intended to cover any and all adaptations or variations of various embodiments, and it will be readily apparent to those of ordinary skill in the art, in light of the teachings of these embodiments, that numerous changes and modifications may be made without departing from the spirit or scope of the appended claims.

What is claimed is:

1. An artificial lighting device, comprising:

an elongate body comprising a tubular sidewall having a channel extending therethrough, the tubular sidewall being formed of a flexible, elastic, and translucent material; and a light source disposed within the channel at a proximal end of the elongate body, the light source having a light transmitting portion, wherein the artificial lighting device is configured for light from the light source to extend through the channel and radiate outward through the tubular sidewall such that, along a length of the elongate body, light emanates from an entire circumference of the tubular sidewall.

2. The artificial lighting device of claim 1, wherein the tubular sidewall is bendable, stretchable, and compressible by a user.

3. The artificial lighting device of claim 1, wherein the tubular sidewall is formed of at least one of: latex, silicone, rubber, or an elastic polymer.

4. The artificial lighting device of claim 1, wherein the elongate body has diameter between ⅛ inch and 36 inches and a length of at least 6 inches.

5. The artificial lighting device of claim 1, wherein the light source is a solid-state lighting component.

6. The artificial lighting device of claim 1, wherein the light source is a light emitting diode or a light emitting plasma.

7. The artificial lighting device of claim 1, wherein the light source emits a luminous flux of at least 110 lumens.

8. The artificial lighting device of claim 1, further comprising an optical lens positioned on or around the light source.

9. The artificial lighting device of claim 8, wherein the optical lens defines the light transmitting portion of the light source.

10. The artificial lighting device of claim 8, wherein the optical lens is configured to focus the light emitted from the light source into the elongate body, the light focused to an emission angle of 10 to 180 degrees.

11. The artificial device of claim 1, further comprising a thermally conductive casing circumferentially surrounding the light source.

12. The artificial lighting device of claim 1, wherein the elongate body is configured to maintain temperatures below 120 degrees Fahrenheit in use.

13. The artificial lighting device of claim 1, wherein an intensity of light emission is substantially constant along a length of the elongate body.

14. An artificial lighting system, comprising:

the artificial lighting device of claim 1, a first housing coupled to the proximal end of the elongate body, and wiring and electronics electrically coupled to the light source, wherein the wiring and electronics are disposed within the first housing.

15. The artificial lighting system of claim 14, wherein the first housing forms a frame, the frame being further coupled to a distal end of the elongate body.

16. The artificial lighting system of claim 14, further comprising a second housing, wherein a distal end of the elongate body is coupled to the second housing.

17. The artificial lighting system of claim 14, further comprising an additional one or more artificial lighting devices coupled to the first housing.

18. The artificial lighting system of claim 14, further comprising a sensing element configured to generate a movement signal upon sensing movement of the elongate body, wherein the sensing element is coupled to a processing module and configured to transmit the movement signal to the processing module, and the processing module is configured to command a change in a sensory output in response.

19. The artificial lighting system of claim 18, wherein the change in the sensory output comprises at least one of: a change between a light-emitting state and a non-light-emitting state, a change in a color of emitted light, a change in light intensity, a change in beam angle, a change between a sound-emitting state and a non-sound-emitting state, a change in an emitted sound, and a change in a vibratory state.

20. The artificial lighting system of claim 19, further comprising a sound generating device or a vibration generating device.

* * * * *